Patented Apr. 28, 1936

2,038,694

UNITED STATES PATENT OFFICE 2,038,694

MEDICAMENT

Dudley H. Wiggins, Indianapolis, Ind., assignor, by mesne assignments, to The Davison Chemical Corporation, Baltimore, Md., a corporation of Maryland No Drawing. Application October 15, 1930, Serial No. 488,989

3 Claims. (Cl. 167—72)

This invention relates to medicaments and more particularly to such substances adapted to treating intestinal and other toxemias.

I have discovered that relief from the effects of such toxemias may be obtained by oral administration of finely comminuted dry gels of one of the class of oxides including silica, tungstia, titania, stannia and alumina.

Methods of making these hard gels having ultra-microscopic pores are known. For instance, in making silica gel, usually a silicate solution is added to an acid solution, forming a sol or reaction mixture. The viscosity of this sol gradually increases until finally the whole solution sets to form what is termed a hydrogel. This is broken into pieces and washed, and finally the washed product is dried. The resulting product is granular silica gel.

The product obtained via the hydrogel is a true adsorbent, for instance, it may take up water vapor to such an extent as to contain from 10% to 50% water when in equilibrium with water vapor at 30° C. and a partial pressure of 22 mm. of mercury.

For the present invention, the above mentioned gels may be impregnated with a metal bearing material such as metals or metal oxides; salts; laxative salts; other laxatives, such as castor oil; or substances inimical to toxins and bacteria. Methods of impregnating gels with these and similar substances are known.

The medicament according to this invention should be extremely finely comminuted, preferably so that 50% to 75% remains in suspension in water after 2 hours and 20% to 40% after 24 hours. The gel may be ground in any suitable manner, as in a colloidal mill or any ordinary mill followed by a cyclone separator and then a bag filter. Exit air from the cyclone separator carries in suspension very finely comminuted particles of gel which are collected in the bag filter. As the particles are carried along by the air, they are referred to as "air-floated" and "bag fines."

Preferably the medicament is taken at meal time, although it may be immersed in milk or other liquids and be taken at other times. The powdered gel may be sprinkled over food such as cereal, for example, much as though it were powdered sugar. It is tasteless and so finely ground that there is no grittiness apparent when eating it.

Insufficient experiments have been performed to determine the manner in which the gel acts, but it may be that it adsorbs the toxins. It is understood that most toxins and many bacteria are ultra-microscopic, and the same is true of the pores in the gels.

The gel may be impregnated with other medicaments of a nature which either supplement the action of the gel in ridding the system of toxins or which have a totally independent or different function. As an example of the former, laxatives which cause activity at the walls of the intestines may be mentioned; of the latter, hydrochloric acid may be mentioned.

Further, two or more gels may be combined such as in a mixture of alumina and silica, in which case, the combined beneficial results of each may be had upon administration.

It is desirable for a patient being treated with gels according to this invention to take a laxative from time to time. The effects of both the laxative and gel may be obtained by impregnating the gel (either plain or metal or metal oxide impregnated) with a laxative. For instance, if a mass of powdered gel is mixed with about one-quarter (or less) as much castor oil by volume, the castor oil is adsorbed by the gel, the gel to all appearances being dry. When taken by the patient, there is no castor oil taste. Furthermore, less castor oil is required for a dose than heretofore, probably because the gel carries the oil without any loss to the place where it is to act. The gel also acts the same as when taken unimpregnated, that is, it removes the toxins.

Where it is desired to employ a laxative salt, or impregnate the gel with other substances, a batch of powdered gel is mixed with a solution of the salt or other substances, about 5% to 25% by volume of the gel being taken. The gel will adsorb all of the solution and remain apparently dry.

Having thus described the invention, what is claimed as new and desired to be secured by Letters Patent is:

1. A medicament for internal use in the treatment of toxemia comprising a dried inorganic gel of such a degree of fineness that 50% to 75% thereof will remain in suspension in water after 2 hours and 20% to 40% after 24 hours.

2. A medicament for toxemia comprising a finely comminuted hard gel of one of the class of oxides including silica, tungstia, titania, stannia, and alumina, having ultra-microscopic pores, said pores being impregnated with a laxative.

3. A medicament for toxemia comprising a finely comminuted hard gel of one of the class of oxides including silica, tungstia, titania, stannia, and alumina, having ultra-microscopic pores, said pores being impregnated with castor oil.

DUDLEY HOWARD WIGGINS.